(No Model.)  
2 Sheets—Sheet 1.

J. R. LITTLE.
FRICTION CLUTCH.

No. 335,463. Patented Feb. 2, 1886.

Witnesses:  
Chas. J. Williamson,  
Henry C. Hazard.

Inventor:  
James R. Little, by  
Prindle & Russell, his Atty (No Model.) 2 Sheets—Sheet 2.
J. R. LITTLE.
FRICTION CLUTCH.
No. 335,463. Patented Feb. 2, 1886.
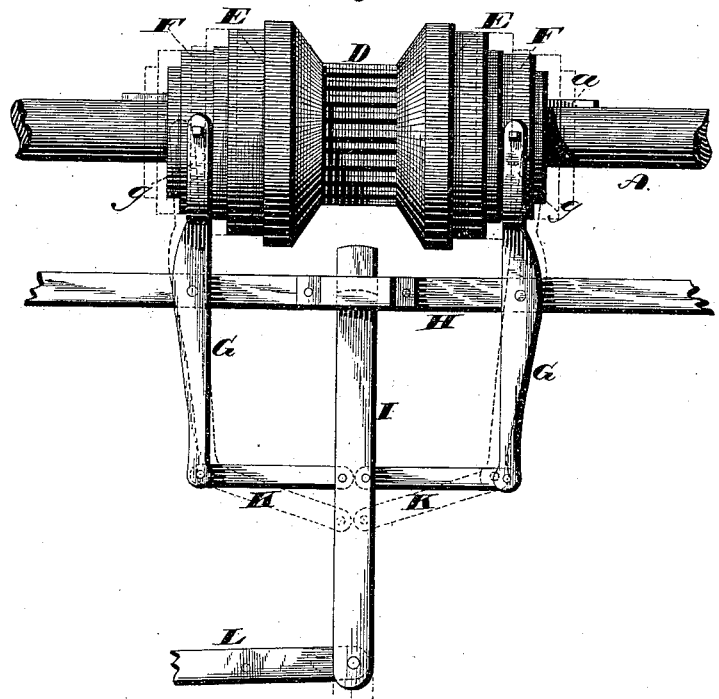
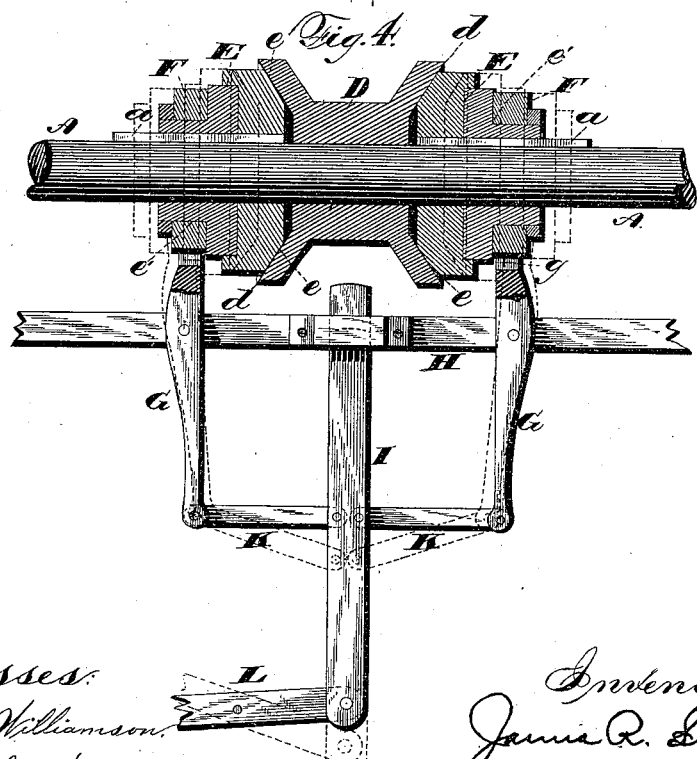
Witnesses:
Chas. J. Williamson
Henry C. Hazard
Inventor:
James R. Little, by
Dindle & Russell, his Attys

UNITED STATES PATENT OFFICE.

JAMES R. LITTLE, OF QUINCY, ILLINOIS, ASSIGNOR TO THE QUINCY METAL WHEEL COMPANY, OF SAME PLACE.

FRICTION-CLUTCH.

SPECIFICATION forming part of Letters Patent No. 335,463, dated February 2, 1886.

Application filed December 10, 1885. Serial No. 185,286. (No model.)

*To all whom it may concern:*

Be it known that I, JAMES R. LITTLE, of Quincy, in the county of Adams, and in the State of Illinois, have invented certain new and useful Improvements in Friction-Clutches; and I do hereby declare that the following is a full, clear, and exact description thereof, reference being had to the accompanying drawings, in which—

Figure 1:
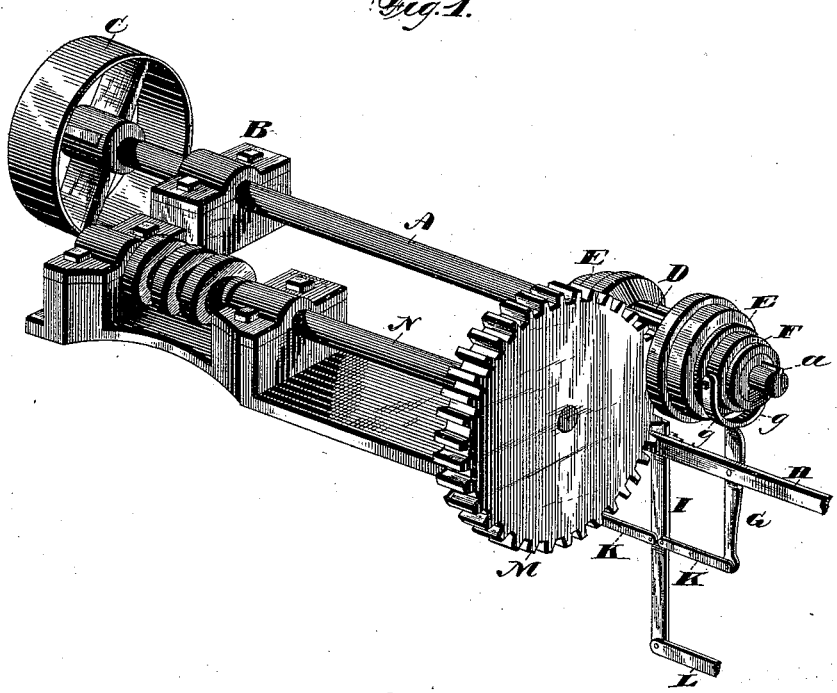
Figure 2:
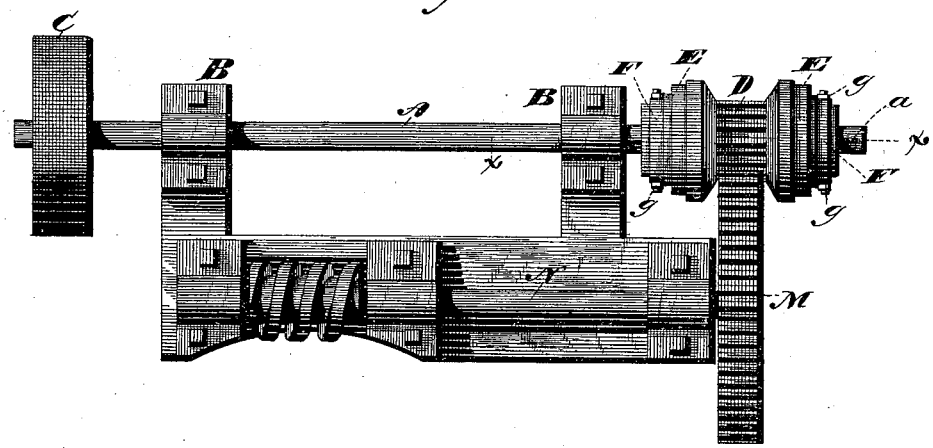

Figure 1 is a perspective view of my clutch mechanism as arranged for operating a counter-shaft. Fig. 2 is a plan view of the same. Fig. 3 is a side elevation of said mechanism, and Fig. 4 is a central longitudinal section upon line $xx$ of Fig. 2.

Letters of like name and kind refer to like parts in each of the figures.

My invention is designed more especially for use in connection with heavy machinery; and it consists in the construction and combination of parts, substantially as and for the purpose herein specified.

In the annexed drawings, A represents a shaft, which is journaled within suitable bearings, B and B, and is driven through a belt-pulley, C, that is attached to one of its ends.

Journaled centrally upon the shaft A is a pinion, D, which at each end is provided with an enlarged concave face, $d$, that is adapted to be engaged by a correspondingly-convex face, $e$, that is found upon the contiguous end of a disk, E, which disk is connected with said shaft by means of a feather or key, $a$, so as to be caused to revolve with while free to move lengthwise of said shaft. Each disk E is provided within its periphery with a circumferential groove, $e'$, within which is journaled a correspondingly-shaped ring, F, that is spanned by the forked end $g$ of a lever, G, which end is pivoted to opposite sides of the same. Said levers G and G extend downward in parallel lines, and at or near their longitudinal centers are pivoted upon a horizontal bearing, H, so as to be capable of movement in a plane parallel with the axis of the shaft A. The lower ends of the levers G are connected with a centrally-located vertically-arranged bar, I, by means of two bars, K, one of which extends horizontally between, and at its ends is pivoted to the latter and each of said levers. Said bar I is adapted to be moved vertically, so as to raise or lower the inner ends of said bars K, and is preferably so moved by means of a foot-lever, L. When raised until said connecting-bars K are nearly or quite in a line with each other, the lower ends of said levers G will be moved outward and their upper ends correspondingly inward until the faces $e$ of the disks E will be caused to impinge upon the faces $d$ of the pinion D with sufficient force to compel said pinion to rotate with said disks, while by lowering said bar I the lower ends of said levers will be drawn inward and said friction-disks released from engagement with said pinion, when the motion of the latter will cease. Any suitable material—such as wood, composition, &c.—may be employed for either or all of the friction-faces. The pinion D is preferably arranged to mesh with a gear-wheel, M, upon a counter-shaft, N, and through the latter motion is imparted to the desired mechanism.

Having thus described my invention, what I claim is—

1. The pinion D, which is journaled upon the shaft A, and is provided at each end with a concave face, $d$, the disks E, that are arranged at opposite ends of said pinion and adapted to be moved lengthwise of said shaft, and are each provided with a convex face, $e$, in combination with means, substantially as shown, whereby said disks may be simultaneously moved inward into engagement with said pinion or outward from engagement with the same, substantially as and for the purpose specified.

2. As a means for moving the friction-disks E and E simultaneously into or out of engagement with the pinion D, the pivoted levers G, having their upper ends engaged with said disks, the vertically-movable bar I, and the connecting-bars K, all combined to operate substantially as shown.

3. The pinion D, journaled upon the shaft A and provided within its ends with concave faces $d$, the disk, E, adapted to slide lengthwise of said shaft and having each a convex inner end, the pivoted levers having their upper ends in engagement with said disks, the vertically-arranged and longitudinally-movable bar I, and the connecting-bars K, in combination with each other and with means whereby said bar I may be moved longitudinally, substantially as and for the purpose set forth.

In testimony that I claim the foregoing I have hereunto set my hand this 13th day of November, A. D. 1885.

JAMES R. LITTLE.

Witnesses:
J. W. GARDNER,
PLINY B. WILLIAMS.